US011625436B2

(12) United States Patent
Kang et al.

(10) Patent No.: US 11,625,436 B2
(45) Date of Patent: *Apr. 11, 2023

(54) SYSTEMS AND METHODS FOR QUERY AUTOCOMPLETION

(71) Applicant: salesforce.com, inc., San Francisco, CA (US)

(72) Inventors: Young Mo Kang, Redwood City, CA (US); Wenhao Liu, Redwood City, CA (US); Yingbo Zhou, Mountain View, CA (US)

(73) Assignee: salesforce.com, inc., San Francisco, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 17/119,941

(22) Filed: Dec. 11, 2020

(65) Prior Publication Data

US 2022/0050876 A1 Feb. 17, 2022

Related U.S. Application Data

(60) Provisional application No. 63/065,942, filed on Aug. 14, 2020.

(51) Int. Cl.
*G06F 16/90* (2019.01)
*G06F 16/9032* (2019.01)
(Continued)

(52) U.S. Cl.
CPC .... *G06F 16/90324* (2019.01); *G06F 11/3428* (2013.01); *G06F 16/9027* (2019.01);
(Continued)

(58) Field of Classification Search
CPC ......... G06F 16/90324; G06F 16/90344; G06F 16/9027
See application file for complete search history.

(56) References Cited

U.S. PATENT DOCUMENTS 9,460,088 B1 * 10/2016 Sak .................... G06F 40/56
9,966,066 B1 5/2018 Corfield et al.
(Continued)

OTHER PUBLICATIONS

Bert Tokenizer Source Code. https://github.com/google-research/bert/blob/eedl5716ce1268e56f0a50264a88cafad334ac61/tokenization.py#L311. Accessed: Jun. 29, 2020, (retrieved Dec. 10, 2020).
(Continued)

*Primary Examiner* — Loc Tran
(74) *Attorney, Agent, or Firm* — Haynes and Boone LLP

(57) ABSTRACT

Embodiments described herein provide a query autocompletion (QAC) framework at subword level. Specifically, the QAC framework employs a subword encoder that encodes or converts the sequence of input alphabet letters into a sequence of output subwords. The generated subword candidate sequences from the subword encoder is then for the n-gram language model to perform beam search on. For example, as user queries for search engines are in general short, e.g., ranging from 10 to 30 characters. The n-gram language model at subword level may be used for modeling such short contexts and outperforms the traditional language model in both completion accuracy and runtime speed. Furthermore, key computations are performed prior to the runtime to prepare segmentation candidates in support of the subword encoder to generate subword candidate sequences, thus eliminating significant computational overhead.

19 Claims, 12 Drawing Sheets

(51) Int. Cl.
| | |
|---|---|
| *G06F 16/901* | (2019.01) |
| *G06F 40/274* | (2020.01) |
| *G06N 3/02* | (2006.01) |
| *G06F 11/34* | (2006.01) |
| *G06K 9/62* | (2022.01) |
| *G06F 40/284* | (2020.01) |
| *G06F 16/903* | (2019.01) |
| *G06F 40/44* | (2020.01) |

(52) U.S. Cl.
CPC ...... *G06F 16/90344* (2019.01); *G06F 40/274* (2020.01); *G06F 40/284* (2020.01); *G06F 40/44* (2020.01); *G06K 9/6256* (2013.01); *G06N 3/02* (2013.01)

(56) References Cited

U.S. PATENT DOCUMENTS

| | | | |
|---|---|---|---|
| 10,282,663 | B2 | 5/2019 | Socher et al. |
| 10,474,709 | B2 | 11/2019 | Paulus |
| 10,521,465 | B2 | 12/2019 | Paulus |
| 10,542,270 | B2 | 1/2020 | Zhou et al. |
| 10,558,750 | B2 | 2/2020 | Lu et al. |
| 10,565,305 | B2 | 2/2020 | Lu et al. |
| 10,565,306 | B2 | 2/2020 | Lu et al. |
| 10,565,318 | B2 | 2/2020 | Bradbury |
| 10,565,493 | B2 | 2/2020 | Merity et al. |
| 10,573,295 | B2 | 2/2020 | Zhou et al. |
| 10,592,767 | B2 | 3/2020 | Trott et al. |
| 10,699,060 | B2 | 6/2020 | McCann |
| 10,747,761 | B2 | 8/2020 | Zhong et al. |
| 10,776,581 | B2 | 9/2020 | McCann et al. |
| 10,783,875 | B2 | 9/2020 | Hosseini-Asl et al. |
| 10,817,650 | B2 | 10/2020 | McCann et al. |
| 10,839,284 | B2 | 11/2020 | Hashimoto et al. |
| 10,846,478 | B2 | 11/2020 | Lu et al. |
| 2009/0106224 | A1 | 4/2009 | Roulland et al. |
| 2016/0350653 | A1 | 12/2016 | Socher et al. |
| 2017/0024645 | A1 | 1/2017 | Socher et al. |
| 2017/0032280 | A1 | 2/2017 | Socher |
| 2017/0140240 | A1 | 5/2017 | Socher et al. |
| 2018/0096219 | A1 | 4/2018 | Socher |
| 2018/0121788 | A1 | 5/2018 | Hashimoto et al. |
| 2018/0121799 | A1 | 5/2018 | Hashimoto et al. |
| 2018/0129931 | A1 | 5/2018 | Bradbury et al. |
| 2018/0129937 | A1 | 5/2018 | Bradbury et al. |
| 2018/0129938 | A1 | 5/2018 | Xiong et al. |
| 2018/0268287 | A1 | 9/2018 | Johansen et al. |
| 2018/0268298 | A1 | 9/2018 | Johansen et al. |
| 2018/0336453 | A1 | 11/2018 | Merity et al. |
| 2018/0373987 | A1 | 12/2018 | Zhang et al. |
| 2019/0130248 | A1 | 5/2019 | Zhong et al. |
| 2019/0130249 | A1 | 5/2019 | Bradbury et al. |
| 2019/0130273 | A1 | 5/2019 | Keskar et al. |
| 2019/0130312 | A1 | 5/2019 | Xiong et al. |
| 2019/0130628 | A1* | 5/2019 | Cao ............... G06V 40/171 |
| 2019/0130896 | A1 | 5/2019 | Zhou et al. |
| 2019/0140995 | A1 | 5/2019 | Wu et al. |
| 2019/0188568 | A1 | 6/2019 | Keskar et al. |
| 2019/0213482 | A1 | 7/2019 | Socher et al. |
| 2019/0251431 | A1 | 8/2019 | Keskar et al. |
| 2019/0258714 | A1 | 8/2019 | Zhong et al. |
| 2019/0258939 | A1 | 8/2019 | Min et al. |
| 2019/0286073 | A1 | 9/2019 | Asl et al. |
| 2019/0355270 | A1 | 11/2019 | McCann et al. |
| 2019/0362020 | A1 | 11/2019 | Paulus et al. |
| 2020/0005765 | A1 | 1/2020 | Zhou et al. |
| 2020/0065651 | A1 | 2/2020 | Merity et al. |
| 2020/0084465 | A1 | 3/2020 | Zhou et al. |
| 2020/0089757 | A1 | 3/2020 | Machado et al. |
| 2020/0090033 | A1 | 3/2020 | Ramachandran et al. |
| 2020/0090034 | A1 | 3/2020 | Ramachandran et al. |
| 2020/0103911 | A1 | 4/2020 | Ma et al. |
| 2020/0104643 | A1 | 4/2020 | Hu et al. |
| 2020/0104699 | A1 | 4/2020 | Zhou et al. |
| 2020/0105272 | A1 | 4/2020 | Wu et al. |
| 2020/0117854 | A1 | 4/2020 | Lu et al. |
| 2020/0117861 | A1 | 4/2020 | Bradbury |
| 2020/0142917 | A1 | 5/2020 | Paulus |
| 2020/0175305 | A1 | 6/2020 | Trott et al. |
| 2020/0184020 | A1 | 6/2020 | Hashimoto et al. |
| 2020/0234113 | A1 | 7/2020 | Liu |
| 2020/0272940 | A1 | 8/2020 | Sun et al. |
| 2020/0285704 | A1 | 9/2020 | Rajani et al. |
| 2020/0285705 | A1 | 9/2020 | Zheng et al. |
| 2020/0285706 | A1 | 9/2020 | Singh et al. |
| 2020/0285993 | A1 | 9/2020 | Liu et al. |
| 2020/0302178 | A1 | 9/2020 | Gao et al. |
| 2020/0302236 | A1 | 9/2020 | Gao et al. |
| 2020/0334334 | A1 | 10/2020 | Keskar et al. |
| 2020/0364299 | A1 | 11/2020 | Niu et al. |
| 2020/0372116 | A1 | 11/2020 | Gao et al. |
| 2020/0372319 | A1 | 11/2020 | Sun et al. |
| 2020/0372341 | A1 | 11/2020 | Asai et al. |

OTHER PUBLICATIONS

OpenFst Library. http://www.openfst.org/twiki/bin/view/FST/WebHome. Accessed: Jul. 27, 2020, (retrieved Dec. 10, 2020).

OpenGRM NGram Library. http://www.openfst.org/twiki/bin/view/GRM/NGramLibrary. Accessed: Jul. 1, 2020, retrieved Dec. 10, 2020).

Subword Language Model for Query Auto-Completion, https://github.com/clovaai/subword-qac. Accessed: Jul. 1, 2020, retrieved Dec. 10, 2020).

Allauzen et al., "OpenFst: A General and Efficient Weighted Finite-State Transducer Library," CIAA 2007, LNCS 4783, pp. 11-23, 2007.

Bar-Yossef et al., "Context-Sensitive Query Auto-Completion," In Proceedings of the 20th International Conference on World Wide Web (Hyderabad, India) (WWW '11), Association for Computing Machinery, New York, NY, USA, 107-116.

Bhatia et al., "Query Suggestions in the Absence of Query Logs," In Proceedings of the 34th International ACM SIGIR Conference on Research and Development in Information Retrieval (Beijing, China) (SIGIR '11), Association for Computing Machinery, New York, NY, USA, 795-804, 2011.

Cai et al., "A Survey of Query Auto Completion in Information Retrieval," Now Publishers Inc., Hanover, MA, USA, 1-33, 2016.

Carbonell et al., "The Use of MMR, Diversity-Based Reranking for Reordering Documents and Producing Summaries," In Proceedings of the 21st Annual International ACM SIGIR Conference on Research and Development in Information Retrieval (Melbourne, Australia) (SIGIR '98), Association for Computing Machinery, New York, NY, USA, 335-336, 1998.

Chen et al., "An Empirical Study of Smoothing Techniques for Language Modeling," In 34th Annual Meeting of the Association for Computational Linguistics, Association for Computational Linguistics, Santa Cruz, California, USA, 310-318, 1996.

Church et al., "K-Best Suffix Arrays," In Human Language Technologies 2007: The Conference of the North American Chapter of the Association for Computational Linguistics; Companion Volume, Short Papers. Association for Computational Linguistics, Rochester, New York, 17-20. 2007.

Dai et al., Transformer-XL: Attentive Language Models beyond a Fixed-Length Context. In Proceedings of the 57th Annual Meeting of the Association for Computational Linguistics. Association for Computational Linguistics, Florence, Italy, 2978-2988, 2019.

Devlin et al., "BERT: Pre-training of Deep Bidirectional Transformers for Language Understanding," In Proceedings of the 2019 Conference of the North American Chapter of the Association for Computational Linguistics: Human Language Technologies, vol. 1 (Long and Short Papers), Association for Computational Linguistics, Minneapolis, Minnesota, 4171-4186, 2019.

Drexler et al., "Learning a Subword Inventory Jointly with Endto-End Automatic Speech Recognition," In ICASSP 2020—2020 IEEE International Conference on Acoustics, Speech and Signal Processing (ICASSP), 6439-6443, 2020.

(56) References Cited

OTHER PUBLICATIONS

Heafield, "KenLM: Faster and Smaller Language Model Queries," In Proceedings of the Sixth Workshop on Statistical Machine Translation. Association for Computational Linguistics, Edinburgh, Scotland, 187-197, 2011.

Heafield et al., "Scalable Modified Kneser-Ney Language Model Estimation," In Proceedings of the 51st Annual Meeting of the Association for Computational Linguistics (Volume 2: Short Papers), Association for Computational Linguistics, Sofia, Bulgaria, 690-696, 2013.

Hsu et al., "Space-Efficient Data Structures for Top-k Completion," In Proceedings of the 22nd International Conference on World Wide Web (Rio de Janeiro, Brazil) (WWW 2013), Association for Computing Machinery, New York, NY, USA, 583-594, 2013.

Kim, "Subword Language Model for Query Auto-Completion," In Proceedings of the 2019 Conference on Empirical Methods in Natural Language Processing and the 9th International Joint Conference on Natural Language Processing, pp. 5022-5032, Hong Kong, China, Nov. 3-7, 2019.

Kudo, "Subword Regularization: Improving Neural Network Translation Models with Multiple Subword Candidates," Proceedings of the 56th Annual Meeting of the Association for Computational Linguistics (Long Papers), pp. 66-75, Melbourne, Australia, Jul. 15-20, 2018.

Kudo et al., "SentencePiece: A Simple and Language Independent Subword Tokenizer and Detokenizer for Neural Text Processing," In Proceedings of the 2018 Conference on Empirical Methods in Natural Language Processing (System Demonstrations), pp. 66-71, Brussels, Belgium, Oct. 31-Nov. 4, 2018.

Kuich and Salomaa (Eds.), "Semirings, Automata, Languages," Springer-Verlag, Berlin, Heidelberg, 1985.

Li et al., "Efficient Type-Ahead Search on Relational Data: A Tastier Approach," In Proceedings of the 2009 ACM SIGMOD International Conference on Management of Data (Providence, Rhode Island, USA) (SIGMOD '09), Association for Computing Machinery, New York, NY, USA, 695-706.

Maxwell et al., "Large-Scale Generative Query Autocompletion," In Proceedings of the 22nd Australasian Document Computing Symposium (Brisbane, QLD, Australia) (ADCS 2017), Association for Computing Machinery, New York, NY, USA, Article 9, 8 pages, 2017.

McCann et al., "The Natural Language Decathlon: Multitask Learning as Question Answering," arXiv preprint arXiv: 1806.08730, 1-23, 2018.

Mikolov et al., "Recurrent Neural Network Based Language Model," Proceedings of the 11th Annual Conference of the International Speech Communication Association, Interspeech 2010 2, 1045-1048, 2010.

Mitra et al., "Query Auto-Completion for Rare Prefixes," In Proceedings of the 24th ACM International on Conference an Information and Knowledge Management (Melbourne, Australia) (CIKM '15). Association for Computing Machinery, New York, NY, USA, 1755-1758, 2015.

Mohri et al., "Weighted FiniteState Transducers in Speech Recognition," Computer Speech Language 16, 1 (Jan. 2002), 1-26.

Park et al., "A Neural Language Model for Query Auto-Completion," Proceedings of the 40th International ACM SIGIR Conference on Research and Development in Information Retrieval 1-4, 2017.

Pass et al., "A Picture of Search," In Proceedings of the 1st International Conference on Scalable Information Systems (Hong Kong) (InfoScale '06), Association for Computing Machinery, New York, NY, USA, 1-es, 1-7, 2006.

Provilkov et al., "BPE-Dropout: Simple and Effective Subword Regularization," In Proceedings of the 58th Annual Meeting of the Association for Computational Linguistics, Association for Computational Linguistics, Online, 1882-1892, 2020.

Radford et al., "Language Models are Unsupervised Multitask Learners," https://d4mucfpksywv.cloudfront.net/better-language-models/language-models.pdf, 1-24, 2018.

Roark et al., "The OpenGrm open-source finite-state grammar software libraries," In Proceedings of the ACL 2012 System Demonstrations. Association for Computational Linguistics, Jeju Island, Korea, 61-66, 2012.

Schuster et al., "Japanese and Korean voice search," In 2012 IEEE International Conference on Acoustics, Speech and Signal Processing (ICASSP), 5149-5152, 2012.

Sennrich et al., "Neural Machine Translation of Rare Words with Subword Units," In Proceedings of the 54th Annual Meeting of the Association for Computational Linguistics (Volume 1: Long Papers), Association for Computational Linguistics, Berlin, Germany, 1715-1725, 2016.

Shen et al., "Learning Semantic Representations Using Convolutional Neural Networks for Web Search," In Proceedings of the 23rd International Conference on World Wide Web (Seoul, Korea) (WWW '14 Companion), Association for Computing Machinery, New York, NY, USA, 373-374, 2014.

Siivola et al., "On Growing and Pruning Kneser-Ney Smoothed N -Gram Models," IEEE Transactions on Audio, Speech, and Language Processing 15, 5 (2007), 1617-1624.

Szpektor et al., "Improving Recommendation for Long-Tail Queries via Templates," In Proceedings of the 20th International Conference on World Wide Web (Hyderabad, India) (WWW '11), Association for Computing Machinery, New York, NY, USA, 47-56, 2011.

Vaswani et al., "Attention is All you Need," In Advances in Neural Information Processing Systems 30, I. Guyon, J. V. Luxburg, S. Bengio, H. Wallach, R. Fergus, S. Vishwanathan, and R. Garnett (Eds.), Curran Associates, Inc., 5998-6008, 2017.

Wang et al., "Realtime Query Completion via Deep Language Models," In SIGIR eCom'18, Jul. 2018, Ann Arbor, Michigan, USA, 1-9, 2018.

Wang et al., "An Investigation of Phone-based Subword Units for End-to-End Speech Recognition," eess.AS, arXiv preprint arXiv:2004.04290, 1-6, 2020.

Wu et al., "Google's Neural Machine Translation System: Bridging the Gap between Human and Machine Translation," arXiv preprint:1609.08144, 1-23, 2016.

Zhang et al., "adaQAC: Adaptive Query Auto-Completion via Implicit Negative Feedback," In Proceedings of the 38th International ACM SIGIR Conference on Research and Development in Information Retrieval (Santiago, Chile) (SIGIR 15), Association for Computing Machinery, New York, NY, USA, 143-152, 2015.

* cited by examiner

700

---
Algorithm 1: Adding failure transitions.
---

Data: E: an FST encoder at Stage 2
Result: E: an FST encoder at Stage 3
// E.start denotes the start state of E
queue ← [(E.start, E.start, $\epsilon$)];
while queue *is not empty* do
    prev, curr, ilabel ← queue.*Pop*();
    // whether to add the phi-transition
    addflag ← curr ≠ E.start;
    // outgoing arcs from the current state
    for arc *in* E.*Arcs*(curr) do
        if arc.ilabel == $\phi$ then
            addflag ← false;
        else if arc.nextstate ≠ E.start then
            queue.*Push*((curr, arc.nextstate, arc.ilabel))
    end
    if addflag then
        // Refer to the description in the text
        dst, olabels1 ← E.*Transition*(prev, $\phi$);
        dst, olabels2 ← E.*Transition*(dst, ilabel);
        olabels ← *Concat*(olabels1, olabels2);
        state ← curr;
        // add consecutive phi-transitions
           emitting olabels
        for i *in* [0..olabels.size − 1) do
            // Add a new state and returns its index
            newstate ← E.*AddState*();
            // Add an arc specified by the given
               four-tuple
            E.*AddArc*(state, $\phi$, olabels[i], newstate);
            state ← newstate;
        end
        E.*AddArc*(state, $\phi$, olabels[−1], dst);
end

---
Algorithm 2: Segmentation search.
---
Data: E: an FST encoder; start: start state of the search
Result: candidates: segmentation candidate sequences
candidates ← ∅;
queue ← [(start, [])];
while queue *is not empty* do
    state, olabels ← queue.*Pop*();
    if state == E.start then
        candidates.*Insert*(olabels);
    else if olabels ∉ candidates then
        for arc *in* E.*Arcs*(state) do
            copy ← olabels;
            if arc.olabel ≠ ϵ then
                copy.*Push*(arc.olabel)
            queue.*Push*((arc.nextstate, copy))
        end
end
---

FIG. 8

| Model | Vocab Size | MRR | | | Success Rate | | | Speed (QPS) | Hardware (#Threads) |
|---|---|---|---|---|---|---|---|---|---|
| | | Seen | Unseen | All | Seen | Unseen | All | | |
| MPC | char | 0.606 | 0.000 | 0.308 | 0.761 | 0.000 | 0.388 | 220,000 | CPU (1) |
| | | 0.398 | 0.000 | 0.242 | 0.563 | 0.000 | 0.342 | | |
| Wang | char | 0.451 | 0.180 | 0.318 | 0.540 | 0.228 | 0.387 | 160 | CPU (8) |
| | | 0.234 | 0.199 | 0.220 | 0.288 | 0.248 | 0.273 | | |
| Kim | char | 0.390 | 0.159 | 0.272 | 0.507 | 0.234 | 0.367 | 60 | GPU |
| | | 0.210 | 0.165 | 0.192 | 0.293 | 0.232 | 0.269 | | |
| | 256 | 0.368 | 0.139 | 0.255 | 0.475 | 0.193 | 0.337 | 120 | |
| | | 0.188 | 0.151 | 0.173 | 0.263 | 0.214 | 0.244 | | |
| | 4096 | 0.357 | 0.134 | 0.247 | 0.468 | 0.189 | 0.331 | 210 | |
| | | 0.183 | 0.146 | 0.169 | 0.263 | 0.211 | 0.242 | | |
| QBZ-char | char | 0.540 | 0.203 | 0.374 | 0.698 | 0.278 | 0.492 | 73,000 | CPU (1) |
| | | 0.290 | 0.232 | 0.267 | 0.399 | 0.315 | 0.366 | | |
| QBZ-256 | 256 | 0.562 | 0.210 | 0.389 | 0.723 | 0.290 | 0.510 | 50,000 | |
| | | 0.334 | 0.248 | 0.300 | 0.461 | 0.341 | 0.414 | | |
| QBZ-4096 | 4096 | 0.612 | 0.217 | 0.418 | 0.766 | 0.299 | 0.537 | 14,000 | |
| | | 0.414 | 0.258 | 0.353 | 0.565 | 0.362 | 0.485 | | |

FIG. 11

| Model | Vocab Size | n-gram Order | Count Cutoff | # States | MRR | Success Rate | Memory Footprint |
|---|---|---|---|---|---|---|---|
| QBZ-char | char | 8 | 0 1 1 2 2 3 3 4 | 6.6M | 0.374 | 0.492 | 5.4 GB |
| QBZ-256 | 256 | 5 | 0 0 0 0 0 | 14.5M | 0.389 | 0.510 | 11.1 GB |
| QBZ-4096 | 4096 | 5 | 0 0 0 0 0 | 40.6M | 0.418 | 0.537 | 29.8 GB |
| - | 256 | 8 | 0 1 1 2 2 3 3 4 | 12.4M | 0.409 | 0.525 | 9.4 GB |
| - | 256 | 8 | 1 2 3 4 5 6 7 8 | 5.9M | 0.401 | 0.516 | 4.5 GB |
| - | 256 | 5 | 1 3 5 7 9 | 1.5M | 0.379 | 0.496 | 1.2 GB |
| - | 256 | 5 | 1 11 21 31 41 | 0.5M | 0.362 | 0.473 | 0.4 GB |
| - | 4096 | 8 | 0 1 1 2 2 3 3 4 | 9.2M | 0.413 | 0.528 | 6.8 GB |
| - | 4096 | 8 | 1 2 3 4 5 6 7 8 | 3.8M | 0.406 | 0.519 | 2.9 GB |
| - | 4096 | 5 | 1 3 5 7 9 | 1.7M | 0.399 | 0.512 | 1.3 GB |
| - | 4096 | 5 | 1 11 21 31 41 | 0.4M | 0.378 | 0.485 | 0.4 GB |

FIG. 12

SYSTEMS AND METHODS FOR QUERY AUTOCOMPLETION

CROSS-REFERENCE(S)

This application is a nonprovisional of and claims priority under 35 U.S.C. 119 to commonly-owned U.S. provisional application No. 63/065,942, filed on Aug. 14, 2020.

This application is related to co-pending and commonly-owned U.S. application Ser. No. 17/119,943, filed Dec. 11, 2020.

All the aforementioned applications are hereby expressly incorporated by reference herein in their entirety.

TECHNICAL FIELD

The present disclosure relates generally to machine learning models and neural networks, and more specifically, to query autocompletion.

BACKGROUND

Query AutoCompletion (QAC) provides an automatic mechanism to complete a search query based on limited user input, e.g., given a user-entered incomplete input prefix consisting of a number of characters entered into a search box, QAC provides alternative ways of extending the prefix into a full query, thus saving the user from further key strokes to manually complete the query. For example, QAC on average may reduce the user's typing from 25% to 50% and has widely used to promote the user satisfaction. QAC application is not only applied in search engines but also has become a part of other various services in other online platforms such as FACEBOOK®, TWITTER®, AMAZON®, and YOUTUBE®. Existing QAC systems generally rely on previously search history and is often unable to address prefixes not seen in the past or may require heavy computation at runtime to complete the incomplete query for a large-scale system.

Therefore, there is a need for an efficient QAC system.

BRIEF DESCRIPTION OF THE DRAWINGS

FIG. 7 provide an example pseudo-code segment illustrating adding a failure or fallback transition to the trie structure at process shown in FIG. 6B, according to one embodiment described herein.

FIG. 8 provide an example pseudo-code segment illustrating performing segmentation search from each state of the constructed FST shown in FIG. 6B, according to one embodiment described herein.

FIGS. 11-12 show data tables summarizing the benchmark results of the QAC system shown in FIGS. 2-3 and compared with previous methods, according to some embodiments described herein.

Figure 1:
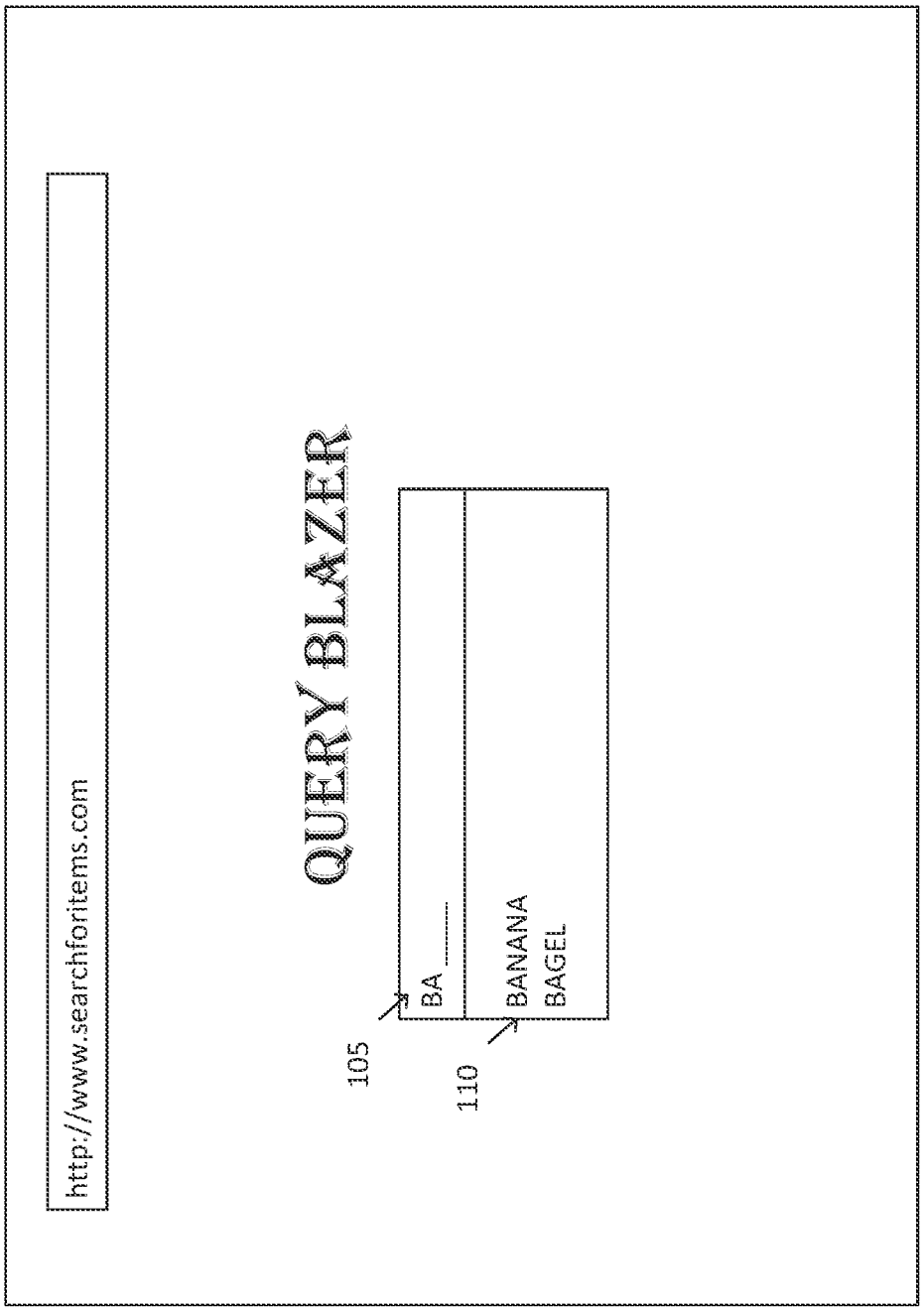
FIG. 1 shows a block diagram illustrating an example application of the subword-based QAC mechanism described herein, according to embodiments described herein.

In the figures and appendix, elements having the same designations have the same or similar functions.

DETAILED DESCRIPTION

Query AutoCompletion (QAC) provides an automatic mechanism to complete a search query based on limited user input. Existing QAC system may adopt a lookup-based approach, which stores the past query history and retrieves the queries that match the user prefix from the database. The lookup-based approach may suggest query completions with good speed, e.g., almost instantaneously in the order of microseconds. However, when the queries are new and unseen, e.g., "COVID-19," it becomes challenging for the lookup-based system to provide accurate completions, as the unseen queries cannot be retrieved from the database. These unseen queries are often referred to as the long-tail queries.

Another existing QAC system uses a neural language model trained with the past query data to generate complete queries based on user entered prefixes and has been shown to improve the completion accuracy for unseen queries. The generative model, however, comes at a cost: querying the language model and performing a beam search requires heavy computation, which makes it difficult to scale for large search engines. For example, the completion runtime for the generative model can be as high as in the order of milliseconds, lagging behind the lookup-based approach by three orders of magnitude. The large gap in computational efficiency serves as one of the major bottlenecks for adopting a generative query completion system in a large scale, despite superior completion accuracy.

In view of the need for an accurate and efficient QAC mechanism, embodiments described herein provide a fully-generative QAC framework based on a subword encoder and an n-gram language model at subword level. Specifically, the QAC framework employs subword encoder that encodes or converts the sequence of input characters (alphabet letters) into a sequence of output characters (subwords). The generated subword candidate sequences from the subword encoder is then for the n-gram language model to perform beam search to generate completion candidates.

During the training stage, a subword vocabulary set is extracted from a training dataset—usually the past query history—and the subword encoder is constructed as a finite state transducer (FST). An n-gram language model is then trained at the subword-level and represented as a weighted FST using the training dataset. The n-gram language model is then used to precompute and store completion candidates according to the subword vocabulary set.

For example, as user queries for search engines are in general short, e.g., ranging from 10 to 30 characters, the n-gram language model at subword level may be used for modeling such short contexts and outperforms the traditional language model in both completion accuracy and runtime speed. Furthermore, key computations are performed prior to the runtime (e.g., during training stage) to prepare segmentation candidates in support of the subword encoder to generate subword candidate sequences and to prepare completion candidates by the n-gram model, thus eliminating significant computational overhead at runtime.

As herein, the term "subword" refers to words that consist of a continuous sequence of characters within a word. For example, subwords of the word "michael" may be "m", "mi", "mic", "mich", . . . , "michael", "i", "ic", "ich", . . . , "ichael", "c", "ch", etc.

As herein, the term "subword encoder" refers to an entity that encodes or converts a sequence of input characters (alphabet letters) into a sequence of output characters (subwords). A subword-level language model encodes an input sentence at the subword-level such that the sequence length is shorter compared to the character representation, and at the same time it resolves out of vocabulary (OOV) issues inherent in the word-level representation. The subword encoder described herein employs the longest prefix matching (LPM) algorithm, which is a deterministic segmentation method in which characters are encoded into the longest matching subwords from left to right. Specifically, an LPM encoder only merges characters from left to right in a greedy fashion. In this way, the LPM requires a fewer number of potential segmentation boundaries, and a direct translation to a finite state transducer (FST) is feasible. The former results in reduced search space, while the latter enables the QAC framework to precompute all segmentation variations in advance, contributing to runtime efficiency.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Overview

FIG. 1 shows a block diagram illustrating an example application of the subword-based QAC mechanism described herein, according to embodiments described herein. Diagram 100 shows a user interface of a browser application, which illustrates a page for a search engine. The search engine page shows a search field 105 that has been filled with a query prefix "BA." For example, a user may be manually entering an intended query that starts with "BA."

The drop-down menu 110 at the search field 105 shows a list of suggested query terms such as "BANANA," "BAGEL," that attempt to automatically complete the user entered query prefix "BA." The suggested query terms may be provided by the QAC mechanism described throughout this application. In this way, the user may select one of the suggested query terms form the drop-down menu 110 without manually entering the full query term in the query field 105, thus saving time from manual typing.

Figure 2:
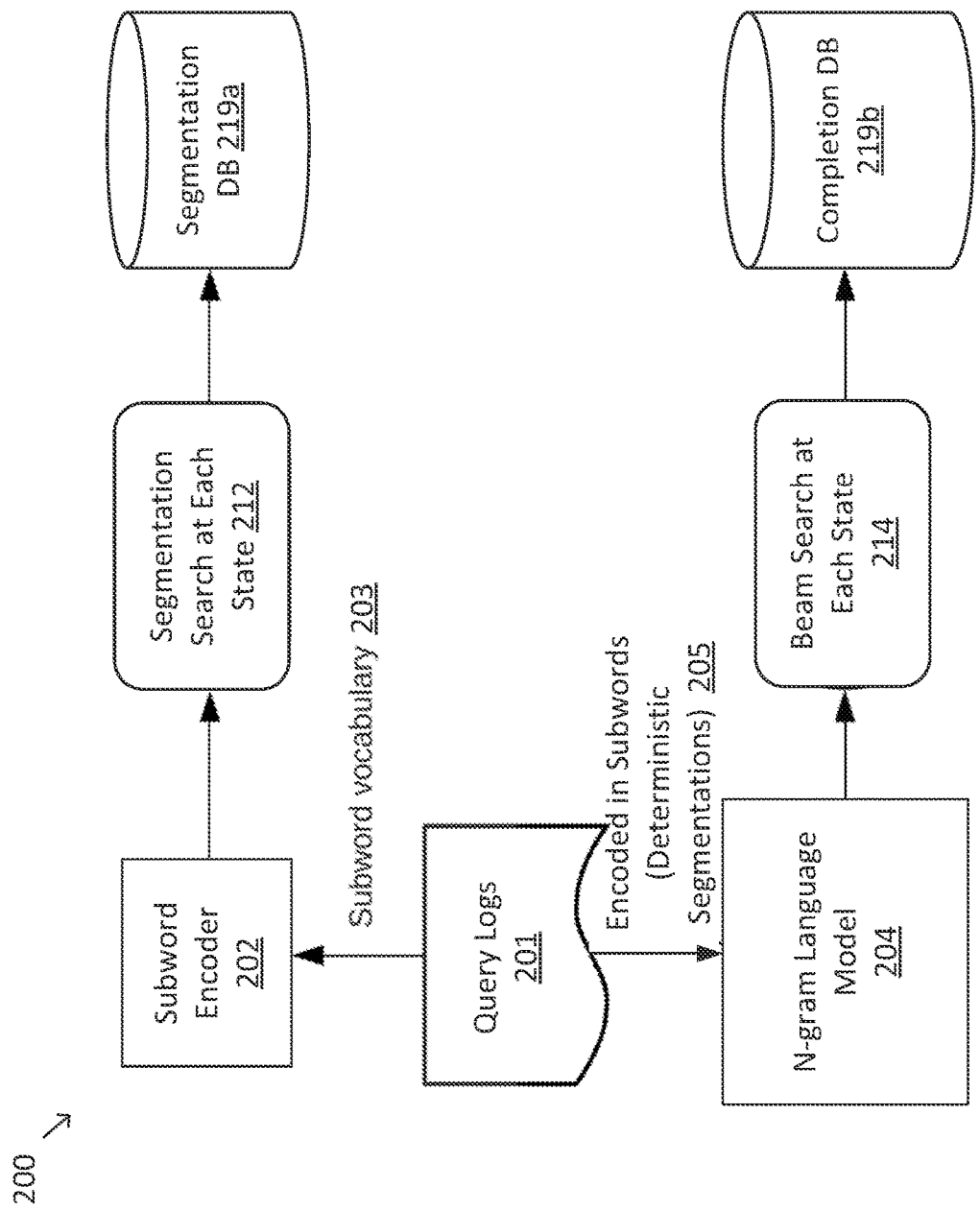
FIG. 2 is a simplified block diagram illustrating a high-level overview of a QAC framework 200 at training stage, according to embodiments described herein.

FIG. 2 is a simplified block diagram illustrating a high-level overview of a QAC framework 200 at training stage, according to embodiments described herein. The QAC framework 200 includes a subword encoder 202 and an n-gram language model 204. During the training stage, a subword vocabulary set 203 is extracted from a training dataset, e.g., past query log 201. For example, subwords that are most commonly observed in the query logs 201 are extracted to form the subword vocabulary 203. The subword extraction process may adopt the byte pair encoding (BPE) method.

The extracted subword vocabulary 203 may then be used to construct the subword encoder 202 as an FST. The construction of the FST-based subword encoder 202 is further described in relation to FIGS. 6A-6B. In one embodiment, the FST of the subword encoder 202 may be utilized to precompute segmentation candidates for every possible query via segmentation search at each state of the FST at 212. Specifically, for every character in the query, the subword encoder 202 makes a transition and lands on one of its states. For every possible query of a finite length, at the end of the last character of the query, the subword encoder 202 makes a finite number of state transitions and lands on one of its states. The segmentation candidates are solely deterministically associated with the final state (the state it lands on at the end) of the subword encoder 202. In this way, the subword encoder 202 clusters/assigns every possible query into one of its states of the FST, from which all possible segmentation candidates may be precomputed. Hence, during the training stage, segmentation candidates can be precomputed associated with each of the subword encoder's states and be cached at the segmentation database 219a.

For every possible query prefix, the subword encoder 202 may generate all subword sequences that can result from the respective query prefix. For instance, for the query prefix of "BA," suppose that the subword vocabulary contains only three subwords that start with the letter "A," namely "A," "AN," and "AG," and there is no subword that starts with "BA." Then, any query that begins with the prefix "BA" must begin with prefix "B/A/", "B/AG/", or "B/AN/" in its subword representation. Thus the segmentation search operation 212 may return all the possible query prefixes as the segmentation candidates. The precomputed segmentation candidates for the query prefix "BA" is stored in the segmentation database 219a. Similarly, segmentation candidates for various query prefixes may be precomputed and cached at the segmentation database 219a. It is noted that the segmentation search for a given query prefix may take place at inference stage in response to a received query prefix. Alternatively, segmentation candidates according to all possible queries may be precomputed and cached at the segmentation database 219a to accelerate computation at inference stage.

In another embodiment, the subword encoder 202 may be used to encode the training data from the query logs 201. For example, the encoded subwords 205 can be used to construct a n-gram language model 204 as a weighted FST at the subword-level. In one implementation, Open-FST and OpenGRM NGram libraries are used for all FST-related operations.

The n-gram language model 204 may be a language model that estimates the probability distribution of a sequence of tokens $y=(y_1, y_2, \ldots, y_l)$ as:

$$p(y) = p(y_1, y_2, \ldots, y_l) = \prod_{j=1}^{l} p(y_j \mid y_1, y_2, \ldots, y_{j-1}).$$

A fully-generative QAC system may find the best sequence of tokens with the highest probability among all sequences that start with the user's input prefix. The search is typically approximated by a beam search for efficiency.

In the n-gram language model 204, the conditional dependency is limited to a fixed number of tokens, thereby modeled as an n-th order Markov model. That is, the conditional probability of a token given a long history is approximated by limiting the history to the last n−1 tokens:

$$p(y_j|y_1,y_2,\ldots,y_{j-1}) \approx p(y_j|y_{j-n+1},y_{j-n+2},\ldots,y_{j-1}).$$

Here, the n-gram language model 204 is employed because its unique data structure enables generation of query completions prior to runtime. Specifically, even if the n-gram model 204 may not be as effective as a neural model for a long sequence, but it can be powerful when the sequence length is close to its order n. Most of the user queries entered in search engines are relatively short, consisting of only several words. As an illustrative example, the mean query length of the public AOL dataset is 18 characters-long. This can be further reduced to less than 6 by encoding the queries with subword vocabulary of size 4096. For example, a 5-gram model may outperform neural models in completion accuracy by a large margin.

In addition, n-gram models may require a larger memory footprint than a neural model because it stores probability distributions in the model. The large space complexity makes it challenging to deploy an n-gram model in systems with hard memory constraint, such as mobile devices. In typical large-scale servers, however, memory resources are cheap and abundant. Therefore, the n-gram language model 204 pruning techniques can effectively reduce the model size, albeit with a slight decrease in the completion accuracy.

The weighted FST representation of the n-gram model 204 maps the model's n-gram history into states. The weighted FST may assign every query into one of its states and in this way, beam search may be performed at each state 214 to enumerate each state and perform beam search 214 during the training stage. This technique removes the primary computational bottleneck in the generative approach, leading to 100× speed-up at runtime. Further details of the weighted FST representation of the n-gram language model 204 are discussed in relation to FIG. 9.

In one embodiment, during the training stage, the subword encoder 202 and the n-gram language model 204 are constructed. During inference stage (as further shown in FIG. 3), in response to each query prefix 302, the subword encoder 202 may perform segmentation search to obtain segmentation candidates, and subsequently for each segmentation candidate, the n-gram language model 204 may in turn perform beam search to obtain the top-k completion candidates corresponding to each segmentation candidate.

Alternatively, in one embodiment, as described above, to improve execution speed at runtime, segmentation candidates 205 may be precomputed and cached from each state of the subword encoder 202 for every possible query. Meanwhile, the completion candidates may also be precomputed for every possible query and cached from beam search operation 214. It is worth noting that the precomputation for every possible query input is made possible because the context is limited by using the n-gram language model 204 (instead of a neural model). Thus, the top-k completion candidates for every n-gram history can be precomputed and cached in the completion database 219b prior to runtime. As the computational overhead for segmentation search 212 and beam search 214 has been largely resolved at training stage, the computations performed during the inference stage, e.g., in response to a real-time query prefix, can be minimal.

Figure 3:
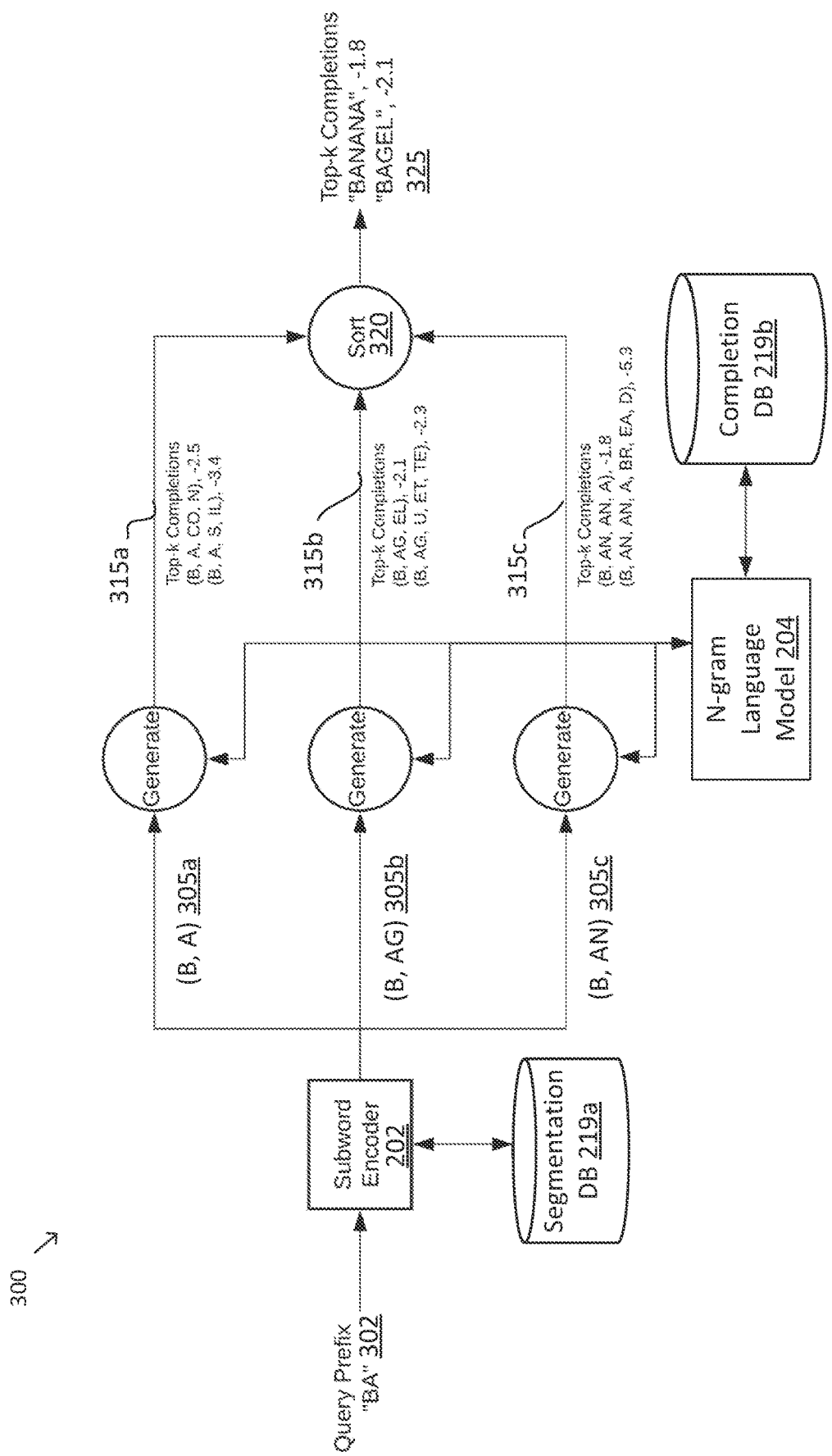
FIG. 3 is a simplified block diagram illustrating a high-level overview of the QAC framework at runtime (inference stage), according to embodiments described herein.

FIG. 3 is a simplified block diagram illustrating a high-level overview of the QAC framework 300 at runtime (inference stage), according to embodiments described herein. At runtime, the subword encoder 202 receives a user's query prefix as a sequence of input characters (alphabet letters), e.g., the query prefix of "BA" 302. The subword encoder 202 may then look up segmentation candidates for the given prefix 302 "BA" in the segmentation database 219a and retrieve precomputed segmentation candidates "B/A/" 305a, "B/AG/" 305b, or "B/AN/" 305c. The retrieves segmentation candidates 305a-c are then fed into the n-gram language model 204.

The n-gram language model 204 may then retrieve precomputed completion candidates 315a-c for each segmentation candidate 305a-c. For example, for segmentation candidate "B/A" 305a, n-gram language model 204 may retrieve the corresponding top 2 completions 315a as "B/A/CO/N" with a likelihood of "−2.5" and "B/A/S/IL" with a likelihood of "−3.4". For segmentation candidate "B/AG" 305b, n-gram language model 204 may retrieve the corresponding top 2 completions 315b as "B/AG/EL" with a likelihood of "−2.1" and "B/AG/U/ET/TE" with a likelihood of "−2.3". For segmentation candidate "B/AN" 305ac n-gram language model 204 may retrieve the corresponding top 2 completions 315c as "B/AN/AN/A" with a likelihood of "−1.8" and "B/AN/AN/A/BR/EA/D" with a likelihood of "−5.3". Among the retrieved completion candidates 315a-c, the sort module 320 may select the top 2 candidates 325 with the highest likelihood, e.g., "BANANA" with a likelihood score of "−1.8" and "BAGEL" with a likelihood score of "−2.1." The top two candidates 325 may then be presented to the user as the suggested completion query, e.g., at 110 shown in FIG. 1.

Therefore, in this way, at runtime, the QAC system may retrieve precomputed completion candidates to return to the user interface for completing a query prefix with little computational overhead. Runtime processing efficiency can thus be largely improved, which allows the query completion process shown by diagram 100 in FIG. 1 to provide completed query candidates to the user real time as the user is entering the query term at 105.

Computer Environment

Figure 4:
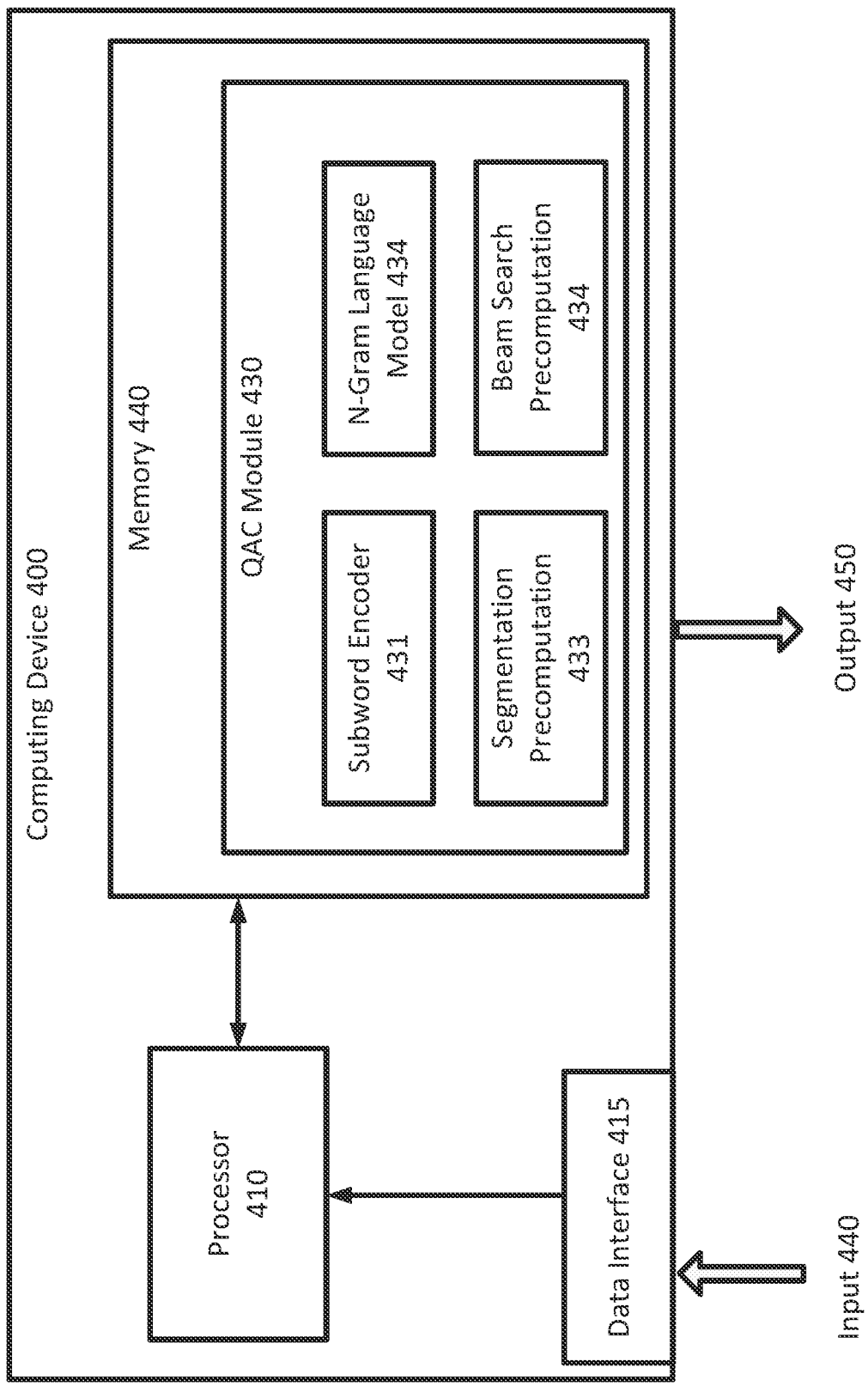
FIG. 4 is a simplified diagram of a computing device for implementing a QAC mechanism, according to some embodiments.

FIG. 4 is a simplified diagram of a computing device for implementing a QAC mechanism, according to some embodiments. As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for a QAC module 430 that may be used to implement and/or emulate the systems and models, and/or to implement any of the methods described further herein. In some examples, the QAC module 430, may receive an input 440, e.g., such as a user input prefix of a query, via a data interface 415. The data interface 415 may be any of a user interface that receives a user entered input, or a communication interface that may receive or retrieve a query prefix from a database. The QAC module 430 may generate an output 450 such as one or more suggested complete queries.

In some embodiments, the QAC module 430 includes a subword encoder 431, an n-gram language model 432, a segmentation precomputation module 433 and a beam search precomputation module 434. Specifically, the subword encoder 431 (similar to subword encoder 202 in FIGS. 2-3) is configured to encode the input 440 of query prefix into one or more candidate subword sequences that can result from the partial input 440. The n-gram language model 432 (similar to subword encoder 204 in FIGS. 2-3) is configured to perform beam search on each of the candidate sequence to generate the completion candidates for the query. The segmentation precomputation module 433 is configured to precompute the top-k most likely output sequence generated by a beam search, e.g., similar to the segmentation search operation 212 in FIG. 2. The beam search precomputation module 434 is configured to precompute the beam search for each state (similar to the beam search operation 214 in FIG. 2), which can be performed independently of other states and can easily run in parallel, which alleviate the QAC module 430 from heavy computation burden for each beam search during execution.

In some examples, the QAC module 430 and the sub-modules 431-234 may be implemented using hardware, software, and/or a combination of hardware and software.

QAC Process

Figure 5:
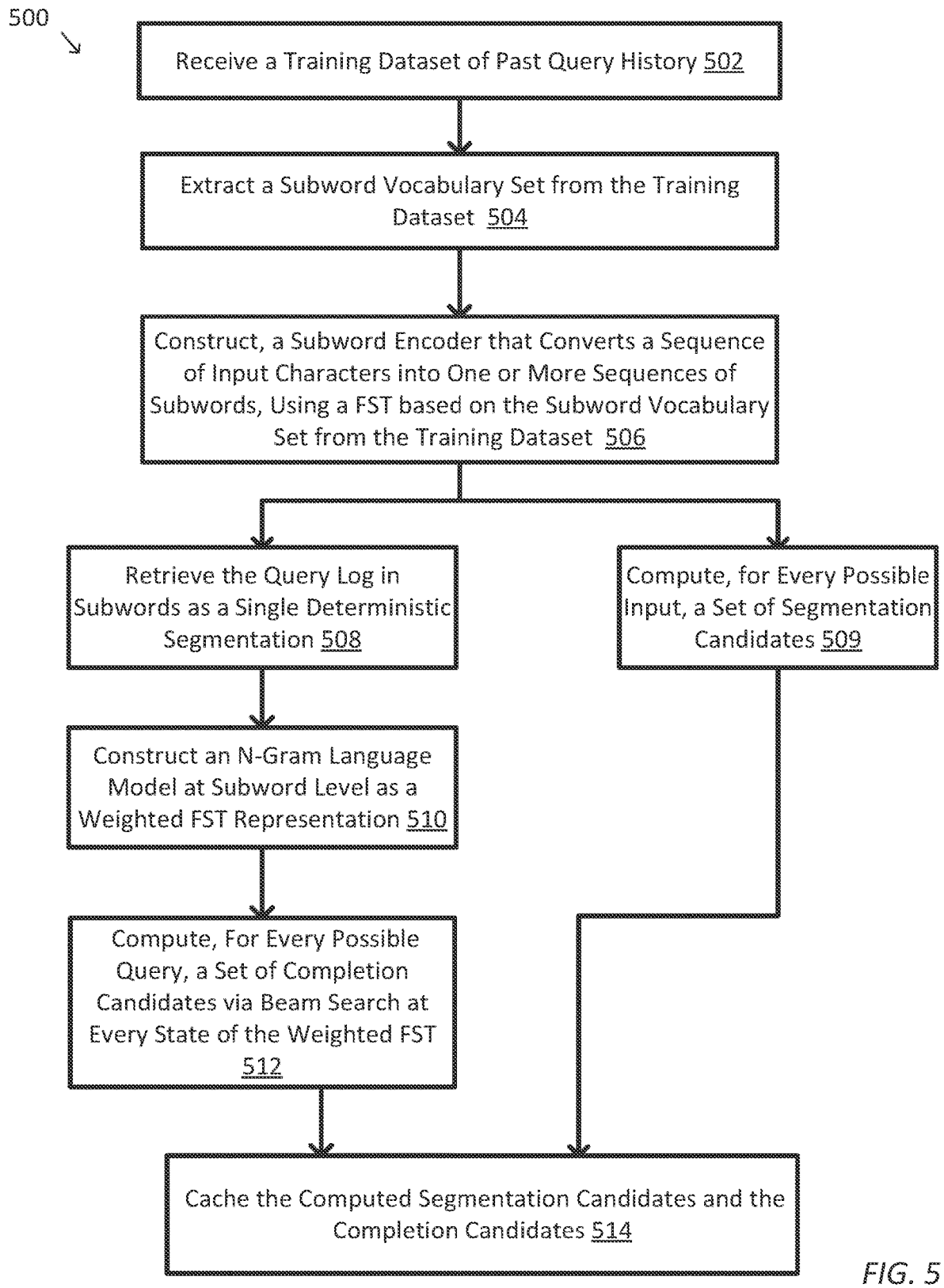
FIG. 5 is a simplified logic flow diagram illustrating a method for training the QAC framework in FIG. 2, according to some embodiments described herein.

FIG. 5 is a simplified logic flow diagram illustrating a method for training the QAC framework 200 in FIG. 2, according to some embodiments described herein. One or more of the processes 502-514 of method 500 may be implemented, at least in part, in the form of executable code stored on non-transitory, tangible, machine-readable media that when run by one or more processors may cause the one or more processors to perform one or more of the processes 502-514. In some embodiments, method 500 may correspond to the method used by the module 430.

At process 502, a training dataset of past query history may be received. For example, the query log 201 comprising various past queries in FIG. 2 may be received for training.

At process 504, a subword vocabulary set may be extracted from the training dataset. For example, the subword vocabulary set may include various subwords that appear in the query log.

At process 506, a subword encoder is constructed as a finite state transducer (FST) that converts a sequence of input characters into one or more sequences of subwords, based on the subword vocabulary set from the training dataset. For example, further details of FST construction may be described in relation to FIGS. 6A-6B.

Method 500 may proceed from process 506 into two branches, which may occur concurrently, alternately or in any other order. In one embodiment, method 500 may proceed to process 509, at which the subword encoder may compute, for every possible query of a finite length, a set of segmentation candidates. The computation may be performed based on the FST construction process shown in FIGS. 6A-8. Method 500 may then proceed from process 509 to process 514 to cache the computed segmentation candidates, e.g., at database 219a shown in FIG. 2.

In another embodiment, method 500 may proceed from process 506 to process 508, where the query log may be encoded at the subword level by the subword encoder (constructed at process 506) as a single deterministic segmentation. At process 510, an n-gram language model at subword level as a weighted FST may be constructed. For example, the weighted FST may be constructed using the OpoenGRM N-Gram library (see Roark et al., the OpenGRM open-source finite-state grammar software libraries, in Proceedings of the ACL 2012 System Demonstrations. Association for Computational Linguistics, pp. 61-66, 2012, which is hereby expressly incorporated by reference herein in its entirety.

At process 512, for every possible user query, a plurality of completion candidates may be precomputed using the n-gram model, e.g., by beam search at every state of the n-gram weighted FST. For example, further details of the completion search may be described in relation to FIG. 9.

At process 514, the computed completion candidates for query autocompletion may be stored, e.g., at the completion database 219b for retrieval at the inference stage.

Figure 6A:
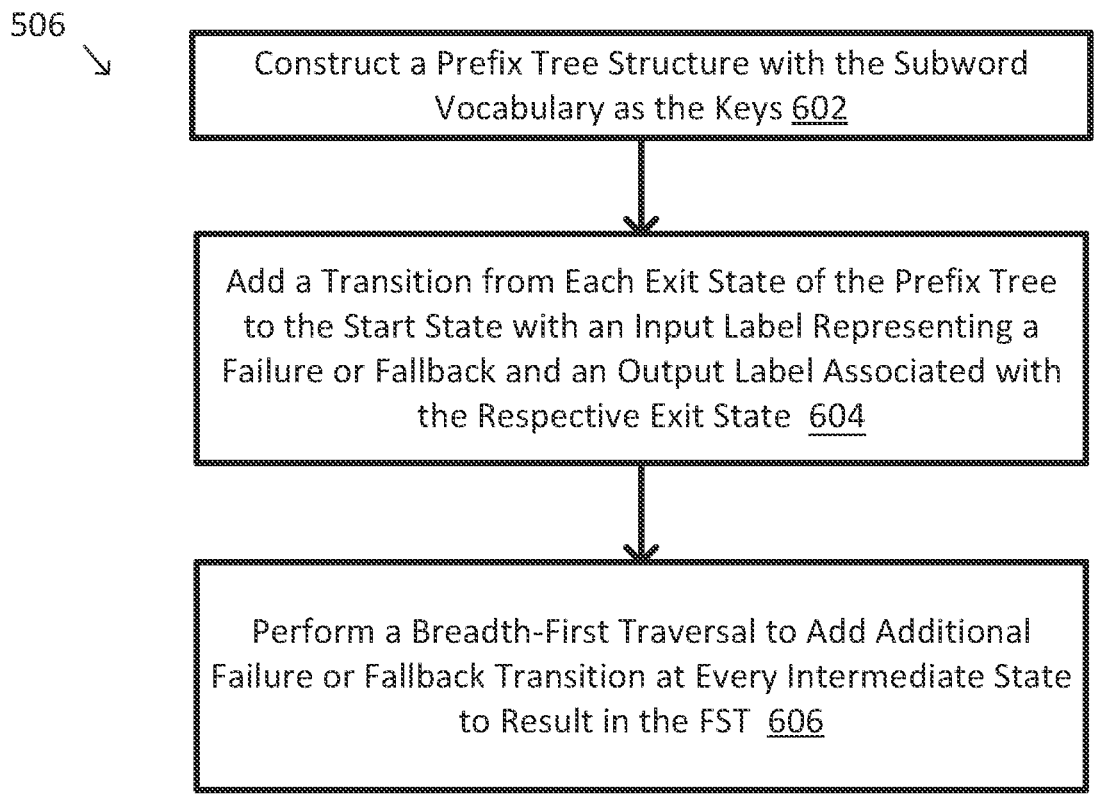
FIG. 6A is a simplified logic flow diagram illustrating a method for the process of constructing a subword encoder using a FST in FIG. 5.
Figure 6B:
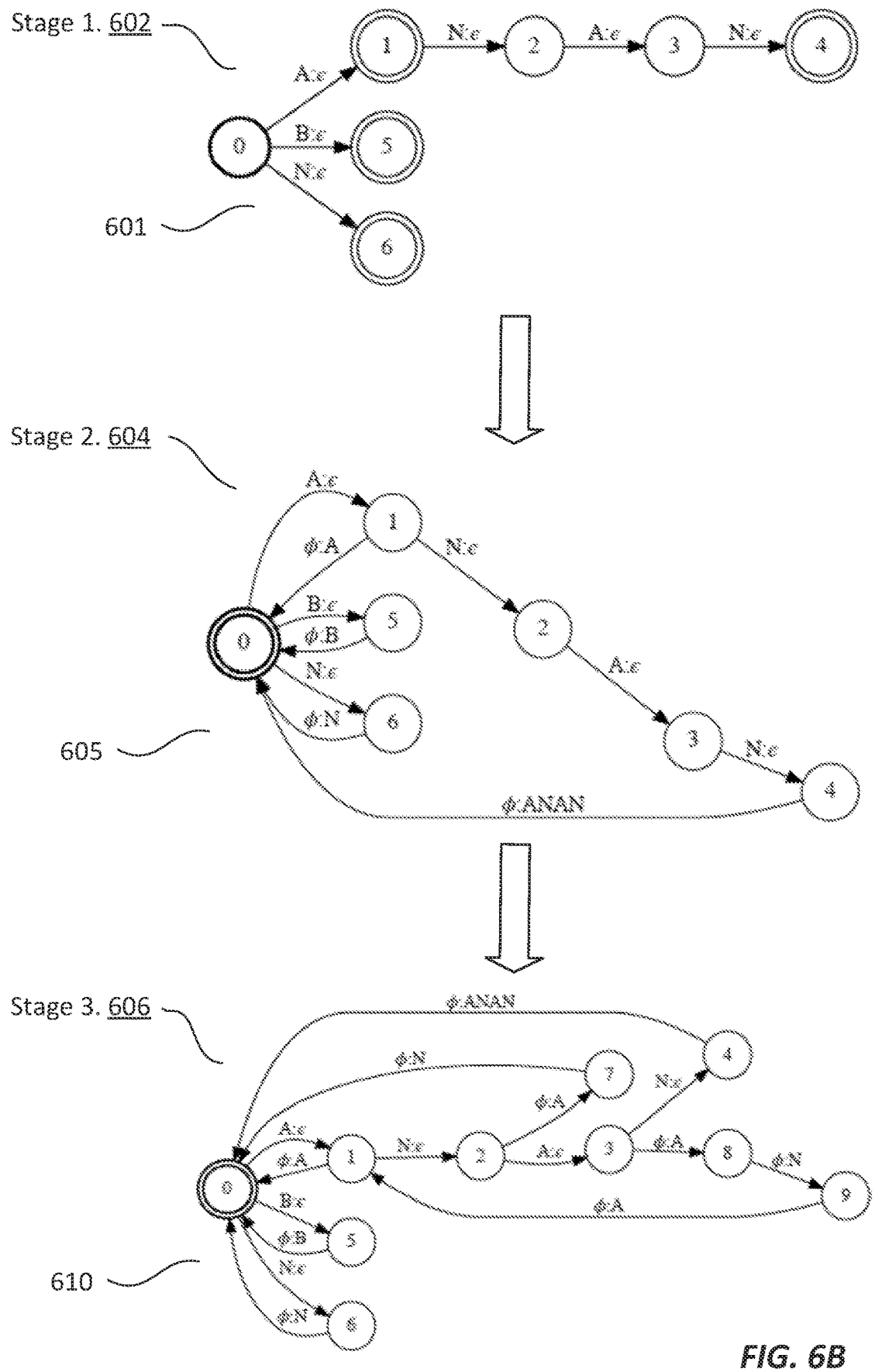
FIG. 6B is a simplified diagram illustrating an example FST construction process corresponding to method shown in FIG. 6A, according to some embodiments described herein.

FIG. 6A is a simplified logic flow diagram illustrating a method for the process 506 of constructing a subword encoder using a FST in FIG. 5, and FIG. 6B is a simplified diagram illustrating an example FST construction process corresponding to method 506 shown in FIG. 6A, according to some embodiments described herein. One or more of the processes 602-606 of method 506 may be implemented, at least in part, in the form of executable code stored on non-transitory, tangible, machine-readable media that when run by one or more processors may cause the one or more processors to perform one or more of the processes 602-606. In some embodiments, method 506 may correspond to the method used by the module 430.

Specifically, let $\chi$, $\mathcal{Y}$ be a set of input characters x and output subwords y, respectively. $\chi$ includes normalized alphabet letters and some punctuation marks, and $\mathcal{Y}$ includes variations of concatenations of input characters. An FST encoder E transduces a sequence of characters $x=(x_1, x_2, \ldots, x_m)$ into a sequence of subwords $y=(y_1, y_2, \ldots, y_n)$, assuming that the subword alphabet set is the superset of the input alphabet set, i.e., $\chi \subseteq \mathcal{Y}$.

At process 602, a trie (e.g., a prefix tree) data structure is constructed with the subword vocabulary as the keys. For example, as shown in FIG. 6B, the trie structure 601 is then converted into an FST as shown at stage 602: the root of the trie 601 is converted to the start state (e.g., state 0) of the FST and the leaf nodes are converted to the exit states (e.g., states 4, 5, 6) of the FST. Each exit state is associated with a subword y∈𝒴. For example, as shown at stage 602, state 4 is associated with the subword "ANAN," which is obtained by concatenating all characters associated with each state from the start state 0 to the exit state 4. The output of each transition is set to ∈.

At process 604, a transition is added from each exit state to the start state with input label ɸ and the output label y associated with the respective exit state. Specifically, ɸ denotes a special symbol for a failure or a fallback transition, which is taken only if there is no outgoing transition that matches the given input. For example, as shown at stage 604 in FIG. 6B, exit state 4 is added with the transition back to the start state 0 with the input label ɸ and the output label "ANAN." The resulting trie structure 605 illustrates the FST after these transition changes.

Noted that at stage 604, not every input sequence can be encoded at this stage. For example, E can encode an input "BANANA" into the output subwords "B/ANAN/A/", but cannot encode an input "ANN", as there is no viable transition for the last input character "N" at state 2. Further fallback transitions are added at stage 606.

At process 606, a breadth-first traversal is performed to add a ɸ-transition at every intermediate state. Specifically, the breadth-first traversal traverses all states in the subword encoder from the start state and adds a series of ɸ-transitions, if it is not at the start state and does not already have a ɸ-transition. Thus, the ɸ-transitions allow the encoder to fall back to the next longest subword matching the input prefix. It recursively follows the fallback path from the previous state and makes one more transition matching the last character in the input. Further details of the breadth-first traversal method to add a failure or fallback transition are described in relation to FIG. 7.

For example, here, the method Transition(p, x) is defined as: if the input symbol x is not 0, the method will make a matching transition from the state p (may be preceded by one or more consecutive ɸ-transitions until the matching arc is found). If x is ɸ, the method will make a single ɸ-transition. In both cases, if a ɸ-transition is the only outgoing arc at the destination state (e.g., at states 4, 5 and 6 shown in trie structure 605 at stage 604 in FIG. 6B), the method will repeatedly take the ɸ-transition. Finally, the method returns its final destination state and the output sequence collected along the way.

As shown in FIG. 6B, the trie structure 610 illustrates a FST that is an LPM encoder that transduces a sequence of input characters x to a subword sequence y. For example, when a user input is x="BA," the FST encoder 610 goes through state transitions 0-5-0-1 and waits for further input from state 1. When the user types additional characters, the encoder resumes making transitions from where it left off. Only when the user enters a newline character, the encoder makes exit transitions by following the ɸ-arcs until reaching an exit state. For example, if the input is "BAN\n", the complete encoding path will be 0-5-0-1-2-7-0 in the FST 610, emitting the output sequence "B/A/N/".

The encoder E is configured to convert a complete query into its subword sequence, but it may encounter the segmentation boundary problem for a partial query prefix. For example, a prefix "BAN" may be the query "BAN" itself, to be encoded as a sequence of subwords "B/A/N/", but also can be a prefix to "BANANA", to be encoded as "B/ANAN/A/" by the FST encoder 610. In this example, the first token "B/" is determinate, but the second token is unknown and can be either "A/" or "ANAN/", depending on the future input. Thus, every possible segmentation candidate needs to be considered during the beam search in order to provide accurate completions to the user.

FIG. 7 provide an example pseudo-code segment 700 illustrating adding a failure or fallback transition to the trie structure at process 606 shown in FIG. 6B, according to one embodiment described herein. Specifically, pseudo-code segment 700 shows building the FST encoder (trie structure 610) at process 606 from the FST encoder (trie structure 605) built at process 604 in FIG. 6B.

Specifically, from the start state of the encoder E, the algorithm iterates other states in a breadth-first manner. At each iterated state, the algorithm determines whether to add the ɸ-transition. For example, a flag "addflag" may be added to the currently iterated state if the currently iterated state is not at the start state and does not already have a ɸ-transition. Thus, for states that have been flagged with "addflag," the ɸ-transition may be added. The output label of the respective state may be the concatenation of the output label of the previous state and the output label of the transited state, e.g., "Concat(oabels1, olabels2)." Consecutive ɸ-transitions may be added to emit output labels, e.g., by adding new states and new arcs connecting the new states from the existing states, "E.AddArc(state, ɸ, olabels[i], newstate)," "state←new state."

FIG. 8 provide an example pseudo-code segment 800 illustrating performing segmentation search from each state of the constructed FST 610 shown in FIG. 6B, according to one embodiment described herein. Specifically, pseudo-code segment 800 shows generating segmentation candidate sequences from the FST encoder 610 having a start state in FIG. 6B. Specifically, starting from a given state in the trie structure, a breadth-first traversal from the given state may be implemented to search for the segmentation candidates. When a state is iterated during the breadth-first traversal, it is determine whether the currently iterated state is the start state: if it is the start state, the search stops; if not a start state, it is further determined whether the output sequence "olabels" along the path is already seen—if not already seen, the output label of the arc connecting to the currently iterated state is added to the candidate.

For example, performing the algorithm shown in 800 on trie structure 610 in FIG. 6B, with start=2 results in candidates=["A/N/", "ANAN/"]. The candidates are concatenated with the determinate label "B/" indicating two segmentation candidates "B/A/N/" and "B/ANAN/." Note that candidates are uniquely determined by the start state of the search. Hence, the segmentation search is performed prior to runtime by iterating the search from every state in the encoder, and the segmentation candidates from the search can be cached in the segmentation database 219a.

Unlike existing retracing algorithm, segmentation search of algorithm 800 does not need to retrace back to the very first character of the input; instead, algorithm 800 only retraces back to the first unknown character, reducing the number of candidates. Furthermore, the search is precomputed during the training stage, leading to higher efficiency. The memory space needed for storing the precomputed segmentation candidates can be significantly less compared to that for storing the completions candidates.

Figure 9:
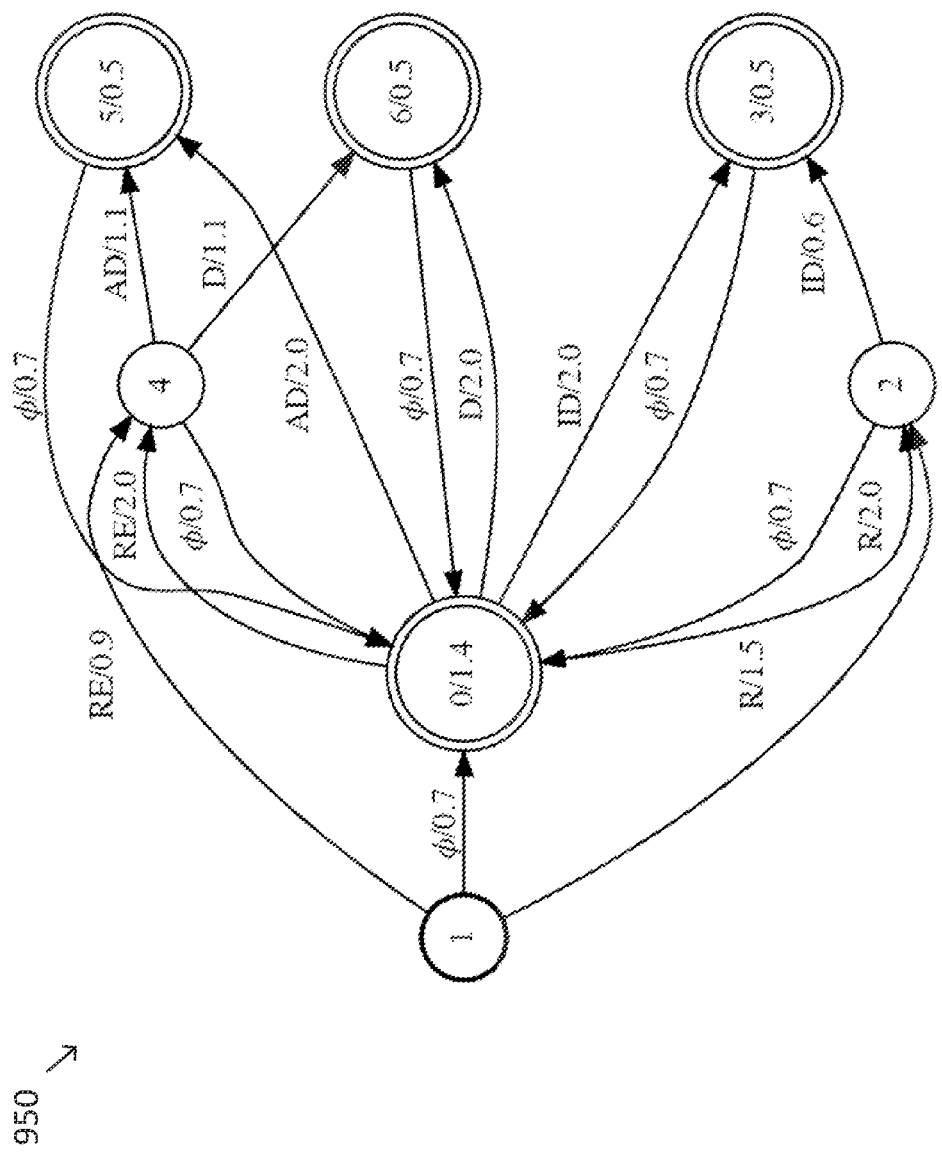
FIG. 9 is a simplified diagram illustrating an example weighted FST constructed for the n-gram language model, according to some embodiments described herein.

FIG. 9 is a simplified diagram illustrating an example weighted FST 950 constructed for the n-gram language model, according to some embodiments described herein. An example n-gram language model may be represented as a weighted FST G 950. Each state in G represents a history h, analogous to the hidden state vector in recurrent neural network (RNN) models. For example, the initial state 1 in G represents the history of the start token "(s)", and state 5 represents the history "(s)/RE/AD/". Here, it is assumed that every input sequence begins with the start token and will not be written explicitly. Note that output labels in G are omitted because they are always equal to the input labels.

Each transition in the graph represents either the next symbol or a backoff, labeled by a φ-symbol. The φ-transition works the same way as defined in relation to FIG. 6B. For any input sequence of a finite length, the model makes state transitions of a finite length and lands on the state that is associated with the input sequence as its history. For example, an input sequence "RE/AD/" follows the state transitions 1-4-5, and hence is associated with the state 5. Similarly, an input sequence "D/D/R/" follows the state transitions 1-0-6-0-6-0-2 and is associated with the state 2. The weight of each transition represents either the negative log conditional probability—log p (y|h) or the backoff weight.

In the weighted FST 950 because every possible input sequence of a finite length is associated with one of the states in the model, each state is iterated and top-k completions are generated via beam search during the training stage. The standard beam search method may be employed to generate most likely sequences, which can be similar to the process described in Park et al., A Neural Language Model for Query Auto-Completion, in Proceedings of the 40th International ACM SIGIR Conference on Research and Development in Information Retrieval, 2017, which is hereby expressly incorporated by reference herein in its entirety. Specifically, the beam search method is applied via the weighted FST (n-gram model) at a subword-level.

For example, a beam search with the beam width β is a breadth-first search where at each level of the search tree, only the top-β hypotheses are kept, reducing the search space. Running the beam search naively with an n-gram model can be slow because the search has to loop through the conditional probability p (y|h) for every token y∈ $\mathcal{Y}$. The greater the vocabulary size $|\mathcal{Y}|$, the slower the search may run. This differs from an RNN language model where one forward step returns the vector of the conditional probabilities for every token at once. One way to expedite the search is to cache a fixed number of top transitions for each state. Once the beam search is complete on all of the states, the cache is no longer needed and can be removed. The memory complexity for storing the completions is O (k|Q|), where l is the average completion length, k denotes the top k results, and Q denotes the finite state set of the weighed FST. This technique is not feasible with neural models because there are intractable number of states in neural models.

Figure 10:
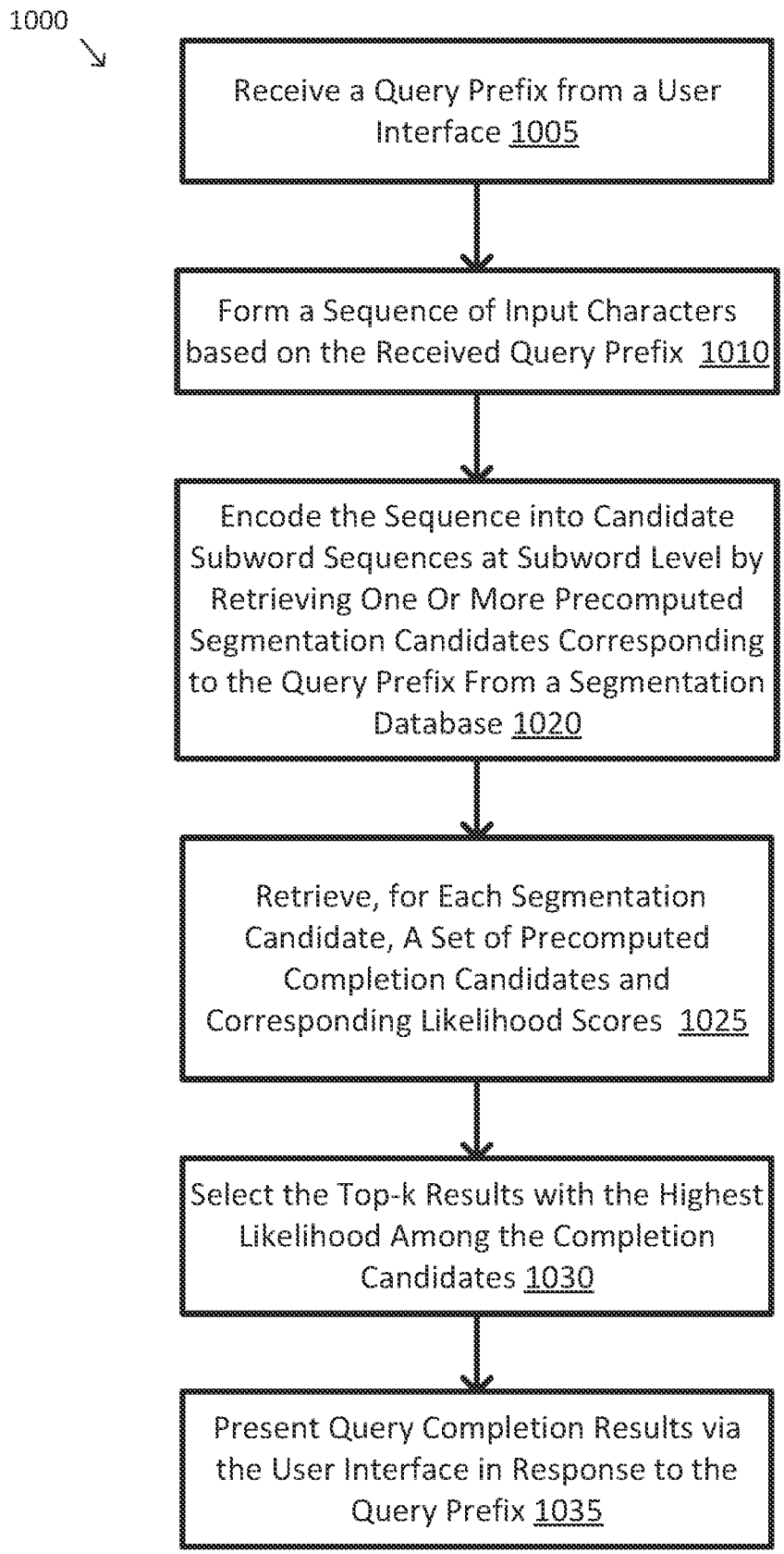
FIG. 10 is a simplified logic flow diagram illustrating a method for operating the QAC framework in FIG. 2 at runtime, according to some embodiments described herein.

FIG. 10 is a simplified logic flow diagram illustrating a method for operating the QAC framework 200 in FIG. 2 at runtime, according to some embodiments described herein. One or more of the processes 1005-1035 of method 1000 may be implemented, at least in part, in the form of executable code stored on non-transitory, tangible, machine-readable media that when run by one or more processors may cause the one or more processors to perform one or more of the processes 1005-1035. In some embodiments, method 1000 may correspond to the method used by the module 430.

At process 1005, a query prefix may be received from a user interface. For example, as shown in FIG. 1, a query prefix "BA" may be received from the search field 105 in a browser application.

At process 1010, a sequence of input characters may be formed based on the received query prefix.

At process 1020, the sequence may be encoded, by a subword encoder, into one or more candidate subword sequences at subword level. For example, one or more precomputed segmentation candidates may be retrieved corresponding to the query prefix from a segmentation database (e.g., database 219a in FIG. 3).

At process 1025, for each segmentation candidate, a set of precomputed completion candidates and corresponding likelihood scores may be retrieved from a completion database (e.g., database 219b in FIG. 3).

At process 1030, the top-k results with the highest likelihood among the completion candidates are selected.

At process 1035, the query completion results may be presented to the user via a user interface. For example, as shown in FIG. 1, the drop-down menu 110 may show one or more completed queries.

Example Performance

The training dataset of a query log (e.g., 201 in FIG. 2) may be obtained by splitting the AOL query logs in time, normalizing, removing duplicates from the same user, and filtering out the queries with less than 3 characters. The queries are time split to obtain the training set, validation set, and test set, each containing 17.5M, 1.5M, and 1.3M queries, respectively. Roughly a half of the test set is unseen in the training set. A test prefix p is then extracted from each of the test query q by randomly selecting a prefix length $2 \leq l_p \leq l_q - 1$, where $l_p$ and $l_q$ denote the prefix and query lengths, respectively. Prefixes of varying lengths are extracted from duplicate queries, simulating a more realistic scenario. For example, the query "google" appears more than 10,000 times in the test set, comprising 0.76% of the test data alone. Roughly equal numbers of prefixes "go", "goo", "goog", and "googl" from the test queries "google".

Three different models are trained: an 8-gram model at the character-level and two 5-gram subword models with the vocabulary size 256 and 4096. Sentence piece is used to extract subword vocabulary using the BPE model. We construct LPM encoders, train the n-gram models with KenLM, and convert to the weighted FSTs using OpenGRM NGram library. Both the segmentation and completions candidates are precomputed and stored in memory.

In one embodiment, two categories of performance metrics for the QAC system may be considered: 1) completion accuracy and 2) time and memory complexity at runtime. For example, completion accuracy measures how well suggested completions match the user's intended query in a QAC system. Higher accuracy leads to better user experience, as the system helps the user search for the intended query with fewer keystrokes. Two different metrics to quantify accuracy of the completions. The first is mean reciprocal rank (MRR), which is the standard measure for evaluating QAC systems. MRR for a test set P is evaluated as:

$$MRR = \frac{1}{|\mathcal{P}|} \sum_{p \in \mathcal{P}} \frac{1}{r_p},$$

where $|\mathcal{P}|$ is the number of the prefixes tested, p is a test prefix provided to the system, and $r_p$ is the rank of the target query within the completion candidates. If the target query is not in the completion candidates, $r_p$ is defined to be ∞. The second is success rate, which measures the ratio of the target query found within the completions. Success rate differs from MRR in that each completion is equally rewarded irrespective of its ranking and is always greater or equal to MRR.

Time and memory complexity at runtime can be critical metrics for large-scale deployments. The time complexity is measured with raw runtime completion speed, measured in queries per second (QPS). Memory complexity is also measured by reporting the system's total memory footprint in resident set size (RSS) including the precomputed results.

FIG. 11 shows a data table summarizing the benchmark results of the QAC system shown in FIGS. 2-3 and compared with previous methods with k=10 and the beam width of 30. The example performance evaluation was performed on an Intel Xeon Gold 5122 processor equipped with NVIDIA Quadro GV100.

The first row is obtained from an implementation of the traditional lookup-based approach in Yossef et al., Context-Sensitive Query Auto-Completion. In Proceedings of the 20th International Conference on World Wide Web, Association for Computing Machinery, pp. 107-116, referred to as MPC. Runtime performance is optimized by precomputing the top-k completions associated with each node in the trie. This approach runs the fastest at 220,000 QPS. However, the overall accuracy is low due to its inability to suggest unseen queries.

The second row is obtained from Beam Search (LSTM-256) in Wang et al., Realtime Query Completion via Deep Language Models, In Proceedings of eCOM@SIGIR, 2018. The overall accuracy is comparable to MPC but is slower by 1,000 times. The runtime we obtain (6 ms) is twice faster than reported (13 ms). A larger model is likely to improve the accuracy but at the expense of slower runtime: The Wang et al. method reports that LSTM-1024 is about 10 times slower than LSTM-256. It took about 8 hours to train the language model on the GPU.

Rows 3-5 are obtained from the char and SR models in Kim, Subword Language Model for Query Auto-Completion, in proceedings of EMNLP/IJCNLP, 2019, running on the GPU. The test with a batch size of 64 to take full advantage of the GPU hardware, expediting the runtime speed by six times than reported in Kim et al. The SR-4096 model (row 5) runs the fastest at 210 QPS among the generative systems employing neural models. It took more than 12 hours to train each of the language model on the GPU. Finally, the last three rows are obtained with the QAC system 200 in FIGS. 2-3. QBZ-4096 achieves the best accuracy, both in MRR and success rate, followed by QBZ-256 and QBZ-char. QBZ-char achieves the fastest runtime speed among the generative approaches at 73,000 QPS. Even the slowest QBZ-4096 achieves roughly 100× faster speed compared to the previous generative systems tested. The difference in speed among the last three rows of various vocabulary sizes may be due to the variations in the number of segmentation candidates. For instance, the QBZ-char model's completions depend on only the last 7-characters of the input. The speed differences among the models may result from the number of segmentation candidates. The training time was less than 15 minutes for each of the model, utilizing 16 threads for precomputation.

FIG. 12 shows an example data table summarizing an overall accuracy and total memory footprint for models of different orders and count cutoffs. QBZ-4096 is not pruned and requires the largest memory at 29.8 GB with the highest number of states Q. The trade-off between accuracy and memory footprint with various pruning configurations are shown in FIG. 12. For example, count cutoff 1 2 3 denotes removing uni-grams of count less or equal to 1, bigrams of count less or equal to 2, and trigrams and higher-order n-grams of count less or equal to 3. The system's space complexity is roughly O(Q), as the language model and the completion results account for the majority of the memory. However, the number of states does not necessarily correlate with completion accuracy. For example, the 8-gram models of vocabulary size 256 with moderate pruning (rows 4 and 5) have fewer states than QBZ-256 but achieve higher accuracy.

As shown in FIG. 12, the 5-gram model of vocabulary size 4096 with an aggressive pruning (the last row), measuring only 400 MB in memory footprint. This model achieves comparable accuracy to QBZ-char with less than one-tenth of the memory space. FIG. 12 can be used as a reference in choosing attributes to adopt in a system by weighing the trade-offs between the completion accuracy and memory requirement.

Some examples of computing devices, such as computing device 200 may include non-transitory, tangible, machine readable media that include executable code that when run by one or more processors (e.g., processor 210) may cause the one or more processors to perform the processes of method 400. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of training a query autocompletion network, the method comprising:
   receiving a training dataset of past query history;
   extracting a subword vocabulary set from the training dataset;
   constructing, a subword encoder as a finite state transducer (FST) that converts a sequence of input characters into one or more sequences of subwords, based on the subword vocabulary set from the training dataset, wherein the constructing includes:
      constructing a trie structure with the subword vocabulary set as keys,
      during a breadth-first traversal of the trie structure:
         adding a matching transition from a respective traversed state when an input symbol to the respective traversed state is not a predetermined input label representing a failure or fallback transition, and
         adding a single failure or fallback transition from the respective traversed state when the input symbol is the predetermined input label;
   computing, by the FST, a plurality of segmentation candidates for every possible query;
   encoding, by the subword encoder, the past query history at subword level into encoded subwords;
   constructing an n-gram language model at subword level as a weighted FST based on encoded subwords;
   computing a plurality of completion candidates by the n-gram language model for every possible query; and
   storing, at a database, the plurality of segmentation candidates and the plurality of completion candidates for query autocompletion.

2. The method of claim 1, wherein the subword encoder is further constructed by:
   adding a transition from each exit state of the trie structure to a start state with an input label representing a failure or fallback transition and an output label associated with the respective exit state; and
   performing a breadth-first traversal on the trie structure to add additional failure or fallback transitions at every intermediate state.

3. The method of claim 2, wherein the trie structure has a root corresponding to the start state and a plurality of leaf nodes, each of which corresponds to an exit state and is associated with a subword in the subword vocabulary set.

4. The method of claim 2, wherein the transition is added from an exit state to the start state when there is no outgoing transition from the exit state that matches a given input to the exit state.

5. The method of claim 2, wherein the breadth-first traversal is performed by:
   for each traversed state:
      adding an additional failure or fallback transition from the respective traversed state to a next state having a longest subword matching an input prefix, when the respective traversed state is not the start state and does not already have a failure or fallback transition.

6. The method of claim 1, wherein the plurality of segmentation candidates is computed by a breadth-first traversal on the FST from a given state representing a determinate token in the sequence of input characters.

7. The method of claim 6, further comprising:
   obtaining one or more subword sequences from the breadth-first traversal; and
   concatenate each subword sequence with the determinate token to result in a respective segmentation candidate.

8. The method of claim 1, wherein the weighted FST is constructed as having a plurality of states, each state representing a history of a subword sequence along a path from a start state to the respective state.

9. The method of claim 8, wherein the weighted FST has a plurality of transitions between states, and each transition is associated with a weight representing a likelihood of an output label given the history of the state.

10. The method of claim 1, wherein the plurality of completion candidates are computed by iterating each state on the weighted FST and generating the plurality of completion candidates for a respective segmentation candidate as having highest likelihoods via beam search.

11. The method of claim 1, wherein the plurality of segmentation candidates and the plurality of completion candidates are precomputed and stored prior to runtime.

12. A system of training a query autocompletion network, the system comprising:
   a hardware communication interface that receives a training dataset of past query history;
   one or more hardware processors that:
   extract a subword vocabulary set from the training dataset;
   construct, a subword encoder as a finite state transducer (FST) that converts a sequence of input characters into one or more sequences of subwords, based on the subword vocabulary set from the training dataset, wherein the constructing includes:
      constructing a trie structure with the subword vocabulary set as keys,
      during a breadth-first traversal of the trie structure:
         adding a matching transition from a respective traversed state when an input symbol to the respective traversed state is not a predetermined input label representing a failure or fallback transition, and
         adding a single failure or fallback transition from the respective traversed state when the input symbol is the predetermined input label;
   compute, by the FST, a plurality of segmentation candidates for every possible query;
   encode, by the subword encoder, the past query history at subword level into encoded subwords;
   construct an n-gram language model at subword level as a weighted FST based on encoded subwords;
   compute a plurality of completion candidates by the n-gram language model for every possible query; and
   a memory that stores, at a database in the memory, the plurality of segmentation candidates and the plurality of completion candidates for query autocompletion.

13. The system of claim 12, wherein the subword encoder is constructed by:
   adding a transition from each exit state of the trie structure to a start state with an input label representing a failure or fallback transition and an output label associated with the respective exit state; and
   performing a breadth-first traversal on the trie structure to add additional failure or fallback transitions at every intermediate state,
      wherein the trie structure has a root corresponding to the start state and a plurality of leaf nodes, each of which corresponds to an exit state and is associated with a subword in the subword vocabulary set.

14. The system of claim 13, wherein the transition is added from an exit state to the start state when there is no outgoing transition from the exit state that matches a given input to the exit state.

15. The system of claim 13, wherein the breadth-first traversal is performed by:
for each traversed state:
adding an additional failure or fallback transition from the respective traversed state to a next state having a longest subword matching an input prefix, when the respective traversed state is not the start state and does not already have a failure or fallback transition.

16. The method of claim 12, wherein the plurality of segmentation candidates is computed by a breadth-first traversal on the FST from a given state representing a determinate token in the sequence of input characters.

17. The system of claim 12, wherein the weighted FST is constructed as having a plurality of states, each state representing a history of a subword sequence along a path from a start state to the respective state, and
wherein the weighted FST has a plurality of transitions between states, and each transition is associated with a weight representing a likelihood of an output label given the history of the state.

18. The system of claim 12, wherein the plurality of segmentation candidates and the plurality of completion candidates are precomputed and stored prior to runtime.

19. A non-transitory processor-readable storage medium storing a plurality of processor-executable instructions for training a query autocompletion network, the instructions being executed by one or more processors to perform operations comprising:
receiving a training dataset of past query history;
extracting a subword vocabulary set from the training dataset;
constructing, a subword encoder as a finite state transducer (FST) that converts a sequence of input characters into one or more sequences of subwords, based on the subword vocabulary set from the training dataset, wherein the constructing includes:
constructing a trie structure with the subword vocabulary set as keys,
during a breadth-first traversal of the trie structure:
adding a matching transition from a respective traversed state when an input symbol to the respective traversed state is not a predetermined input label representing a failure or fallback transition, and
adding a single failure or fallback transition from the respective traversed state when the input symbol is the predetermined input label;
computing, by the FST, a plurality of segmentation candidates for every possible query;
encoding, by the subword encoder, the past query history at subword level into encoded subwords;
constructing an n-gram language model at subword level as a weighted FST based on encoded subwords;
computing a plurality of completion candidates by the n-gram language model for every possible query; and
storing, at a database, the plurality of segmentation candidates and the plurality of completion candidates for query autocompletion.

* * * * *